United States Patent [19]
Choi

[11] Patent Number: 5,145,137
[45] Date of Patent: Sep. 8, 1992

[54] ANGLE ADJUSTING APPARATUS OF AN LCD FOR A CAR STEREO

[75] Inventor: Heung M. Choi, Kyonggi, Rep. of Korea

[73] Assignee: Hyundai Electronics Ind., Co., Ltd., Kyonggi, Rep. of Korea

[21] Appl. No.: 619,004

[22] Filed: Nov. 28, 1990

[30] Foreign Application Priority Data

Nov. 30, 1989 [KR] Rep. of Korea ............... 1815489[U]

[51] Int. Cl.⁵ ............................................. A47F 5/00
[52] U.S. Cl. ................................... 248/288.5; 312/7.1
[58] Field of Search ................ 248/288.5, 288.3, 278, 248/183; 312/7.1; 455/345, 347, 348; 361/422, 390, 391

[56] References Cited

U.S. PATENT DOCUMENTS

| | | | |
|---|---|---|---|
| 2,604,818 | 7/1952 | Morgenstern | 248/183 X |
| 4,293,859 | 10/1981 | Sergent | 455/345 X |
| 4,445,228 | 4/1984 | Bruni | 455/345 X |
| 4,542,872 | 9/1985 | Marino | 248/183 |
| 4,549,710 | 10/1985 | Prince | 248/183 |
| 4,857,378 | 8/1989 | Bhargava | 312/7.1 X |
| 4,874,110 | 10/1989 | Klein | 312/7.1 X |

FOREIGN PATENT DOCUMENTS

| | | | |
|---|---|---|---|
| 2500968 | 8/1975 | Fed. Rep. of Germany | 312/7.1 |
| 60-193498 | 12/1985 | Japan . | |
| 62-158395 | 10/1987 | Japan . | |

Primary Examiner—J. Franklin Foss
Attorney, Agent, or Firm—Burns, Doane, Swecker & Mathis

[57] ABSTRACT

A movable display assembly is incorporated in the car stereo for adjusting the screen viewing angle of the LCD. The movable display assembly comprises a semi-spherical display means and a guide shaft for guiding the display means in any direction within a semi-circular cavity which is formed in the forwardly opening of the front panel of the car stereo. The semi-spherical display means includes a convex rear wall and an LCD constituting the front face of the display means. The guide shaft extends horizontally from the rear face of the display means and is loosely fitted in an opening formed in the cavity. A frictional means is provided in order to hold the movable display means in place.

8 Claims, 2 Drawing Sheets.

ANGLE ADJUSTING APPARATUS OF AN LCD FOR A CAR STEREO

BACKGROUND OF THE INVENTION

This invention relates to a positioning apparatus. More, and more particularly to a car-stereo display device with an angle adjusting apparatus for adjusting the car stereo display screen viewing angle.

Normally, the prior art car stereo display device is displaced at the right side of drivers. Therefore, a driver has to look askance at the screen surface of the car stereo display, which produces the crosstalk of an LCD, thus making it difficult for a driver to view characters being displayed on the screen.

To solve this problem, a tilt mechanism may be built into the display device. However, this type of arrangement may be difficult to manufacture with undesirable small characters needed.

Accordingly, it is a primary object of the present invention to provide a car stereo display with a screen viewing angle adjusting apparatus which is readily adjustable in position and held in place over a long period of use.

It is another object of the present invention to provide a viewing angle adjusting apparatus which is easy to manufacture without necessity of making characters being displayed on the screen small.

According to the present invention there is provided an angle adjusting apparatus of an LCD for a car stereo comprising a main body to be incorporated in the dashboard of a car and a front panel including a display assembly, the apparatus comprising: a semicircular cavity formed in the forwardly facing wall of the front panel and having an opening of comparatively large diameter in the center of the rear wall thereof; a display assembly comprising a semi-spherical display means, including a semi-spherical rear wall member and an LCD attached to the front of the semi-spherical rear member, and a guide shaft extending from the rear face of the semispherical wall member and movably received in the opening in the semicircular cavity to mavably guiding the semi-spherical display means for adjusting the viewing angle of the screen surface of the display member; and a frictional support means comprising a frictional contact plate closely attached to the face of the cavity and a compression coil spring to support resiliently the frictional contact plate on the rear face of the cavity.

These and other features of the invention are set forth in the appended claims.

BRIEF DESCRIPTION OF THE DRAWINGS

The present invention can be put into practice in various ways two of which will now be described by way of examples with reference to the accompanying drawings in which.

DETAILED DESCRIPTION OF THE PREFERRED EMBODIMENTS

Figure 1:
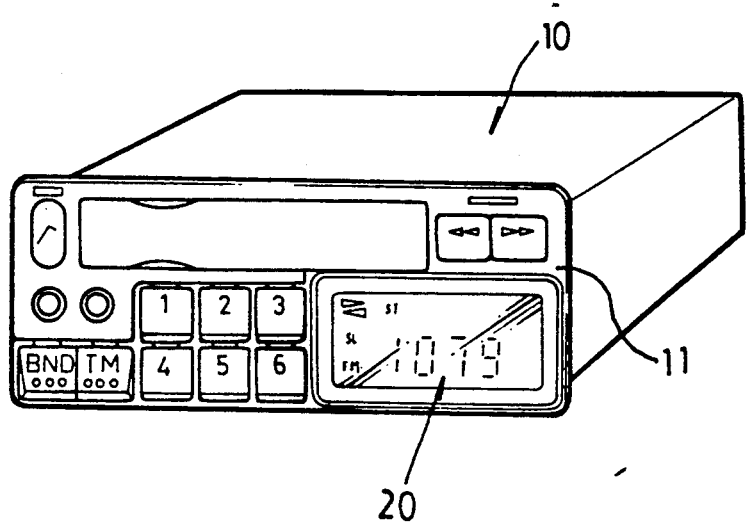
FIG. 1 is a perspective view of the angle adjusting apparatus of the present invention as utilized with a car stereo.
Figure 2:
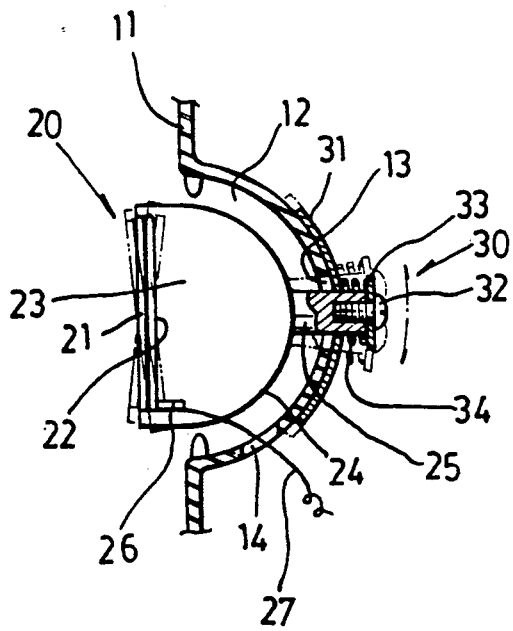
FIG. 2 is a longitudinal sectional view of the view angle adjusting apparatus of FIG. 1.
Figure 3:
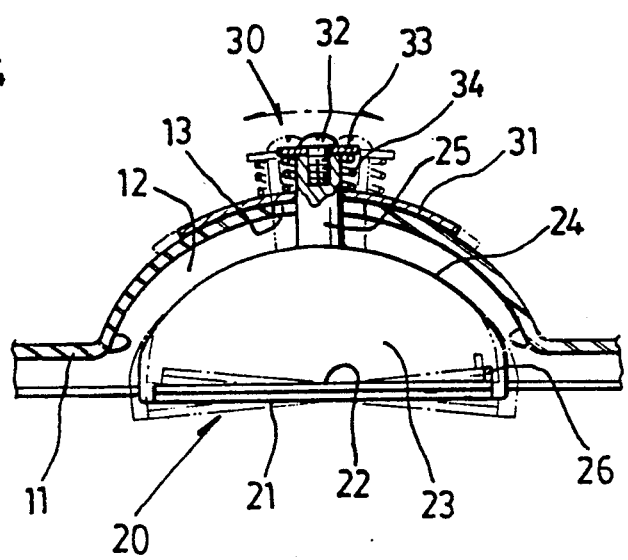
FIG. 3 is a horizontal sectional view of the view angle adjusting apparatus of FIG. 2.

FIGS. 1 through 3 show a first embodiment of the angle adjusting apparatus of the present invention. There is shown a car stereo comprising a main body 10 which may be incorporated in the dashboard of a car. The front of the main body 10 has a panel 11 which has at one side thereof a forwardly opening, semicircular cavity 12.

A movable display assembly 20 comprises a semi-spherical display means 23 and a guide shaft 25 to support and guide the semispherical display means 23 in any direction within the semicircular cavity 12.

The semi-spherical display member 23 includes a convex, rear wall 24, a transparent plate 21 and an LCD 22. The convex rear wall 24 has approximately the same curvature as the semicircular cavity 12 for being movably received in the cavity 12. The LCD is attached to the inner face of the transparent plate 21 so that the information being displayed on the screen of the LCD will be visible through the transparent plate 21.

The guide shaft 25 extends horizontally from the center of the convex rear wall 24 and is loosely fitted in a relatively large central opening 13 provided in the center of the semicircular cavity 12. The outer diameter of the guide shaft 25 is smaller than that of the central opening 13 to achieve the loose fit between the two.

With this arrangement, the movable display assembly 20 is free to move within the semicircular cavity 12 in any direction.

A frictional support means 30 is provided to maintain the movable display assembly 20 is the adjusted position once a desirable view angle is obtained.

For this purpose, the frictional support means 30 comprises a frictional contact plate 31 which is resiliently and closely attached to the rear face of the convex rear wall 24 by means of a compression coil spring 34. The frictional contact plate 31 has a diameter larger than that of the central opening 13.

The compression coil spring 34 is mounted between a washer 33 of a screw 32 and the frictional contact plate 33.

With this arrangement, the frictional contact plate 31 slides smoothly on the rear face of the semicircular cavity 12 during the adjustment of the angle while keeping the display member 23 in the adjusted position with stability after the adjustment has been completed. The washer 34 is effective to support the compression coil spring 34.

A non-central opening 14 is provided in one side of the semicircular cavity 12 to connect a wire 27 connected to ZEBRA in the LCD, to the circular in the main body 10 by passing the wire 27 therethrough.

The operation of the angle adjusting apparatus of the present invention will now be described. To get the desired viewing angle, the driver need only pull or push the movable display member 23 in any desired direction. Simultaneous with the pulling or pushing, the guide shaft 25 moves within the central opening 13. Once the desired viewing angle is obtained, the movable display member 23 is maintained in the adjusted position with stability due to the frictional force of the frictional contact plate 31 against the semicircular cavity 12.

Figure 4:
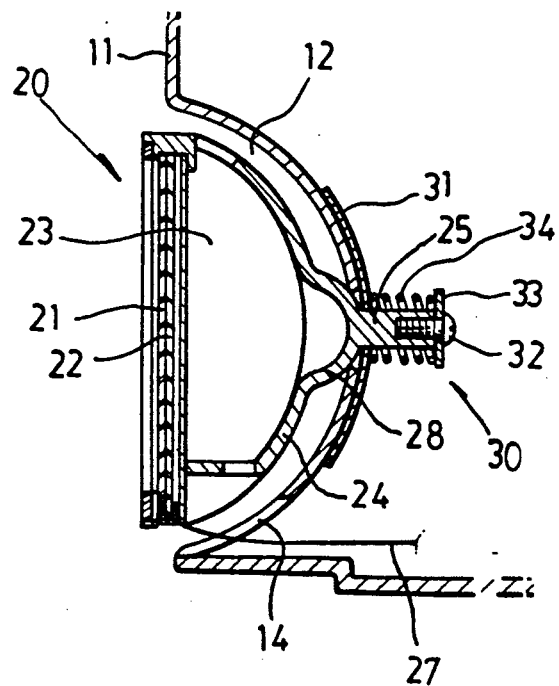
FIG. 4 is similar to FIG. 2, but showing a first modification of the view angle adjusting apparatus of the present invention.
Figure 5:
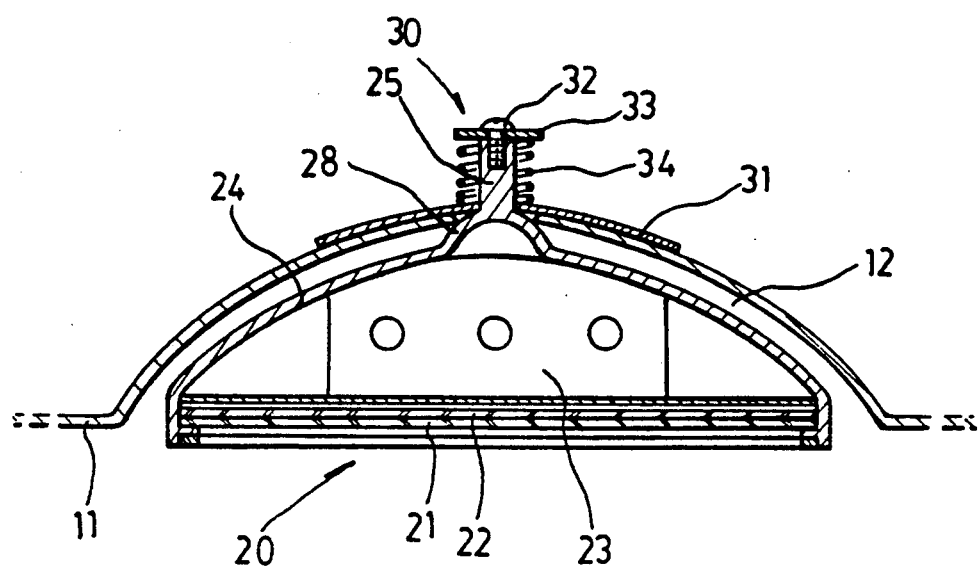
FIG. 5 is similar to FIG. 3, but showing a first modification of the view angle adjusting apparatus of the present invention.

FIGS. 4 and 5 show a second embodiment of the angle adjusting apparatus of the present invention. As shown, another semispherical member 28 is attached to the center of the convex rear wall 24 with the radius of curvature smaller than that of the semispherical member 28. With this arrangement, the contact are between the front face of the semicircular cavity 12 and the rear face of the convex rear wall 24 is reduced, thereby, the adjustment of the angle of the movable display member 23 is achieved further smoothly.

Except for the semispherical member 28, the elements of the second embodiment are identical with and operate identically with those of the first embodiment. Therefore, the description of the structural arrangement and operation of such elements are omitted.

While there has been illustrated two forms of the invention, certain changes may be made without departing from the spirit of the invention as set forth in the appended claims and in some cases, certain features of the invention may be used to advantage without a corresponding use of other features.

I claim:

1. An angle adjusting apparatus for a display of a car stereo having a main body to be incorporated in the dashboard of a car and a front panel;
   a recessed semi-spherical wall formed in a forwardly facing wall of the front panel and having a circular opening formed in the center of the recessed wall;
   a display assembly including a substantially semi-spherical support means, said support means including a first substantially semi-spherical rear wall member and a second substantially semi-spherical rear wall member extending rearward from the first rear wall member, said first rear wall member having a larger radius of curvature than said second rear wall member;
   said display assembly further including an LCD attached to a front of the first semi-spherical rear wall member, and a guide shaft extending rearward from the second rear wall member, said guide shaft being movably received in the opening in the recessed wall to movably guide the display assembly so as to adjust the viewing angle of the LCD of the display assembly; and
   frictional support means mounted on the guide shaft, said support means including a frictional contact plate closely attached to the recessed wall adjacent the opening, and means for resiliently urging the contact plate against a rear surface of said recessed wall.

2. The apparatus of claim 1, wherein said urging means includes a compression spring, washer, and a screw mounted to said guide shaft.

3. The apparatus of claim 1, wherein said first rear wall member is retained within the recessed semi-spherical wall.

4. The apparatus of claim 3, wherein the curvature of said recessed semi-spherical wall is similar to the curvature of said first rear wall member.

5. The apparatus of claim 3, wherein said urging means includes a compression spring, washer, and a screw mounted to said guide shaft.

6. The apparatus of claim 1, wherein the curvature of said recessed semi-spherical wall is similar to the curvature of said first rear wall member.

7. The apparatus of claim 1, wherein the radius of curvature of said second rear wall member is smaller than the radius of curvature of said recessed semi-spherical wall.

8. The apparatus of claim 7, wherein the curvature of said recessed semi-spherical wall is similar to the curvature of said first rear wall member.

* * * * *